United States Patent
Higgins

(10) Patent No.: US 6,848,611 B1
(45) Date of Patent: Feb. 1, 2005

(54) CHECK CASHING SYSTEM

(75) Inventor: John B. Higgins, Bethany, OK (US)

(73) Assignee: ATM Outsources, Inc., Oklahoma City, OK (US)

( * ) Notice: Subject to any disclaimer, the term of this patent is extended or adjusted under 35 U.S.C. 154(b) by 0 days.

(21) Appl. No.: 10/197,957

(22) Filed: Jul. 17, 2002

Related U.S. Application Data

(60) Provisional application No. 60/383,221, filed on May 23, 2002.

(51) Int. Cl.[7] .............................................. G06F 17/00
(52) U.S. Cl. ..................................................... 235/375
(58) Field of Search ........................ 235/375, 379–381, 235/485–487, 376, 378, 382; 705/77–80, 1, 43, 75, 73, 64, 41, 45, 39, 21; 902/23; 382/137

(56) References Cited

U.S. PATENT DOCUMENTS

| | | | | |
|---|---|---|---|---|
| 5,291,003 A | * | 3/1994 | Avnet et al. | ................. 235/381 |
| 6,105,007 A | * | 8/2000 | Norris | ........................... 705/38 |
| 6,129,273 A | * | 10/2000 | Shah | ........................... 235/380 |
| 6,308,887 B1 | * | 10/2001 | Korman et al. | ............. 235/379 |
| 6,473,500 B1 | * | 10/2002 | Risafi et al. | ........... 379/144.01 |
| 2003/0046249 A1 | * | 3/2003 | Wu | .............................. 705/79 |

* cited by examiner

*Primary Examiner*—Thien M. Le
*Assistant Examiner*—Edwyn Labaze
(74) *Attorney, Agent, or Firm*—Dunlap, Codding & Rogers, P.C.

(57) ABSTRACT

A customer interface system for use with a check processing system. The customer interface system has a check reader and a card issuing machine. The check reader receives a check code indicative of a check having value and transmits the check code to the check processing system for at least one of authorizing and guaranteeing payment of at least a portion of the value of the check. The card issuing machine is operatively associated with the check reader. The card issuing machine receives an authorization code representing at least one of the authorization and the guarantee from the check processing system and provides an outputted card having a value thereon.

21 Claims, 1 Drawing Sheet

CHECK CASHING SYSTEM

CROSS-REFERENCE TO RELATED APPLICATIONS

The present patent application claims priority to the provisional patent application identified by U.S. Ser. No. 60/383,221, filed May 23, 2002, entitled "CHECK CASHING SYSTEM", the entire content of which is hereby expressly incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates generally to a check cashing system, and more particularly, but not by way of limitation, to an improved process for cashing checks and distributing cards having a value thereon.

2. Brief Description of Related Art

Check cashing stores are well known places for providing check cashing services to people, even though they do not have money deposited in the place where the check is presented. A check cashing store is typically a stand-alone location manned by a store clerk. A customer presents the check to the store clerk along with a valid identification, such as a driver's license. The store clerk then runs the check through a check reader. The check reader reads a check code and transmits the code to a check processing system, such as Global Payments, Inc. The check processing system determines if the check is valid and authentic and then submits an authorization code back to the check reader so that the store clerk can give the customer cash for the check. A high risk of crime occurs in this type of system due to the high rate of cash flow and the large amounts of cash needed for such transactions.

Another type of check cashing system utilizes an automated teller machine ("ATM") associated with a bank. However, in this system, checks are only cashed for persons having funds deposited at that institution. In addition, an identification card having a secret code is utilized during the transaction.

Recently, a check reader has been interfaced with an ATM to provide a check cashing system not requiring a clerk. However, one drawback to this system is the persistent problem of the ATM running out of cash. This requires that the company servicing the ATM continually supply the ATM with enough cash to keep the ATM functioning.

To this end, a need exists for a check cashing system that will provide a process of cashing a check so as to reduce the risk of crime and the large supplies of needed cash. It is to such a check cashing system that the present invention is directed.

BRIEF SUMMARY OF THE INVENTION

In general, the present invention relates to a check cashing system for cashing a check having a predetermined value, such as $50.00 or $100.00. For example, the check can be a preprinted check, such as a payroll check. The check cashing system is provided with a check reader, a check processing system and a card issuing machine.

The check reader has an input device and an output device. The input device obtains a check code from a check having a predetermined value. The output device receives the check code and transmits the check code.

The check processing system guarantees payment of at least a portion of the predetermined value of the check. The check processing system receives the check code, determines the validity of the check, and transmits an authorization code.

The card issuing machine receives the authorization code and provides an outputted card loaded with at least a portion of the predetermined value of the check.

Because at least a portion of the predetermined value of the check is loaded onto the outputted card, the cash needed to cash the check is reduced. As a consequence, the risk of crime and the large supplies of needed cash are reduced.

BRIEF DESCRIPTION OF A VIEW OF THE DRAWING

DETAILED DESCRIPTION OF THE INVENTION

Figure 1:
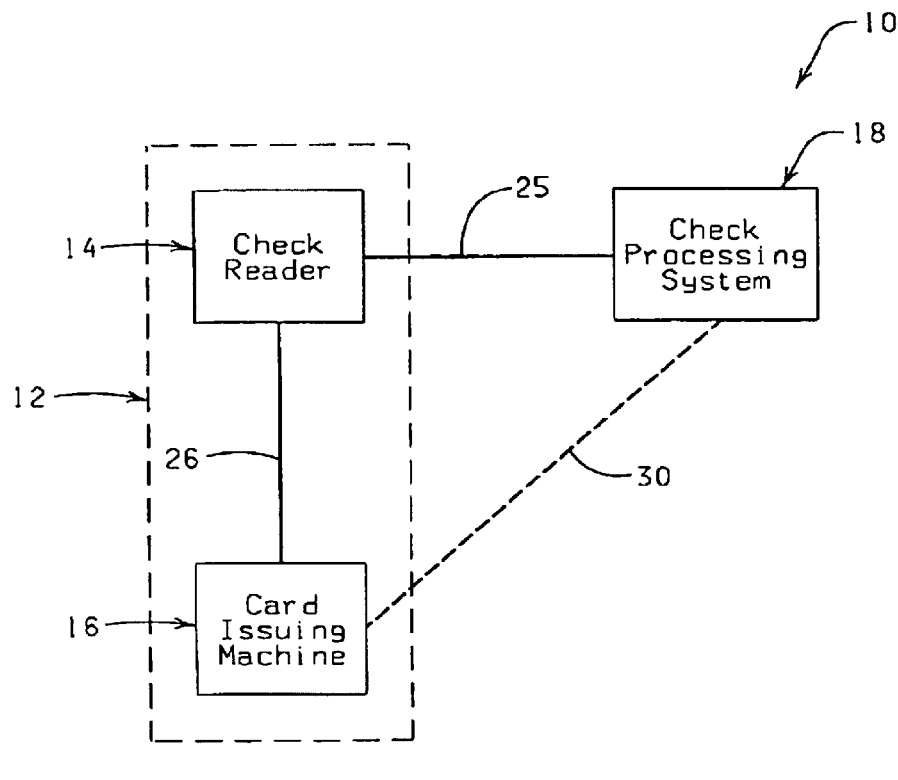
FIG. 1 is a diagrammatic representation of a check cashing system of the present invention.

Referring now to FIG. 1, a check cashing system 10 is shown in accordance with the present invention. The check cashing system 10 includes a customer interface system 12 having one or more check readers 14 and one or more card issuing machines 16. The check cashing system 10 further includes one or more check processing systems 18. Only one of the check readers 14, card issuing machines 16, and check processing systems 18 are shown in FIG. 1 for purposes of clarity. It is envisioned that more than one check reader 14 and more than one card issuing machine 16 will communicate with one check processing system 18.

The check reader 12, the card issuing machine 16, and the check processing system 18 are individually well-known in the art. Thus, no further description of their components or construction is believed necessary in order for one skilled in the art to understand and implement the check cashing system 10 of the present invention. However, it is believed that the particular combination of the check cashing system 10, including the check reader 14, the card issuing machine 16, and the check processing system 18 is novel, as well as the following uses of the check reader 14, the card issuing machine 16, and the check processing system 18. Further, it should be understood that a plurality of check readers 14 and card issuing machines 16 may be used with the check processing system 18.

The check cashing system 10 may be utilized at a point of sale, however, it should be understood that the check cashing system 10 may be utilized in various ways in accordance with the present invention. For example, the check cashing system 10 may be utilized at a check cashing store.

Figures 2, 3:
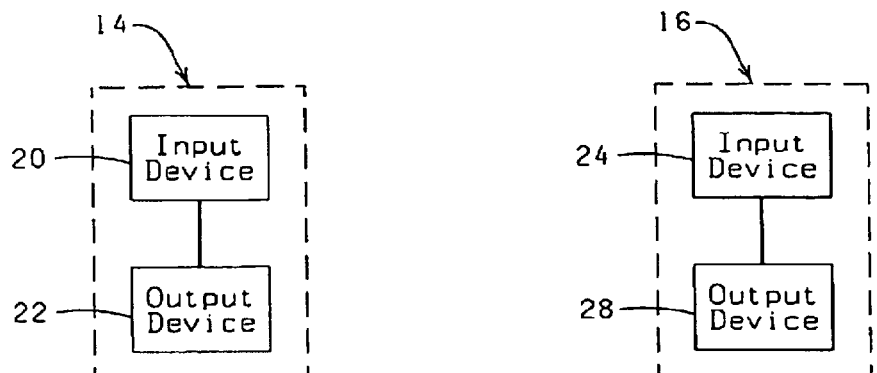
FIG. 2 is a diagrammatic representation of a check reader of FIG. 1.
FIG. 3 is a diagrammatic representation of a card issuing machine of FIG. 1.

As shown in FIG. 2, each of the check readers 14 has an input device 20 and an output device 22. The input device 20 is capable of reading a check code provided on the check having a value and the output device 22 receives and transmits the check code. The input device 20 usually provides a slot for inserting the check which allows the check code to be read magnetically. However, any suitable input device capable of reading a check code can be used.

One example of a check reader is the CHEQ'R™ check reader by Stone West, Inc. Other check readers have been combined with printers so as to print out an authorization slip. EZCheck offers a system that includes the EC5000i Imager check reader and the Talento Terminal; the Talento Terminal with built in printer and Mag-Tek check reader; and the Scribe-612 printer and IVI-3000 check reader. The check readers 14 are capable of receiving a variety of reprinted checks, such as third-party government or payroll checks, checks payable by insurance companies, or checks payable to independent contractors, governments or governmental agencies. These third-party instruments are capable of being negotiated and transferred.

The check readers 14 are preferably provided at remote locations such that the check readers 14 are convenient for customers. For example, the check readers 14 can be provided at a variety of different locations, such as retail stores, banks, kiosks or the like.

Referring now to FIG. 3, the card issuing machines 16 are capable of receiving an authorization code and dispensing or providing an outputted card having a value thereon for purchasing goods or services. The card issuing machines 16 have an input device 24 in communication with at least one of the check readers 14 and the check processing system 18. The authorization codes can be input into the card issuing machines 16 either manually or electronically. That is, the authorization codes can be provided to a clerk or a customer and the clerk or the customer can enter the authorization code into the card issuing machines 16 via any suitable input device 24, such as a keyboard, keypad, microphone, video wand, or a mouse. Alternatively, the authorization code can be provided to the card issuing machine 16 in electronic form. In this instance, the input device 24 would typically be an electronic communication device, such as a modem, radio-frequency communication unit of the like.

The card issuing machines 16 are preferably provided at remote locations such that the card issuing machines 16 are convenient for customers. In one embodiment, at least one check reader 14 and at least one card issuing machine 16 are provided in a same location so that a customer can in effect cash a check by processing the check through the check reader 14 and receiving the outputted card from the card issuing machine 16. The outputted card can also be authorized by swiping the outputted card through a magnetic-strip card reader, such as TRANS 380 and TRANS330 developed by VeriFone®. Alternatively, the check reader 14 and the card issuing machine 16 can be provided at separate locations.

In use, a customer presents a check to a clerk who runs the check through the check reader 14. The check reader 14, which is operatively associated with the check processing system 18, receives the check code indicative of a check having a value and transmits the check code to the check processing system 18 via a signal path 20. The check processing system 18 determines if the check is valid by identifying the check code and then generating an authorization code for at least one of authorizing and guaranteeing payment of at least a portion of the value of the check. The authorization code is transmitted back to the check reader 14 via the signal path 25.

The check reader 14 receives the authorization code and outputs the authorization code in a format perceivable by an individual. Once the clerk has received the authorization code, representing the guarantee or authorization from the check processing system 18, the clerk enters the authorization code into the card issuing machine 16, which is in operatively associated with the card issuing machine 16 via a signal path 26. For the clerk to enter the authorization code into the card issuing machine 16, the card issuing machine 16 is typically present at the same location as that of the card reader 14. The card issuing machine 16 is capable of issuing transaction cards having a value thereon, such as credit cards and debit cards, among others.

The input device 24 of the card issuing machine 16 receives the authorization code. With the receipt of the authorization code, the card issuing machine 16 programs, activates, and or otherwise loads an outputted card with an output device 28. The authorization code does not have to necessarily have to be loaded from the check processing system 18, but may be loaded from a third-party database. Loading data from a third-party database is well-known in the art thus, no further description of components or construction is believed necessary in order for one skilled in the art to understand and implement the loading of the outputted card with the authorization code. It should be understood that in accordance with the present invention at least some of the money from the check goes on the outputted card, however, the entire amount of the check is not required to be present on the outputted card. The outputted card can be one physical card or multiple physical cards. In certain instances, the customer can select the amount of money to be provided on the outputted card. In these instances, the clerk or the customer would typically enter an amount into the check reader 14 or the card issuing machine 16.

In one embodiment, the check processing system 18 submits the authorization code directly to the card issuing machine 16, via a signal path 30. The signal paths 25, 26, and 30 can be airway or cable communication links. In another embodiment, the card reader 14 and the card issuing machine 16 do not have to be present at the same location. That is, upon receipt of the authorization code from the check processing system 18 as discussed above, the clerk presents the customer with the authorization code which the customer then takes to any one of the card issuing machines 16 and acquires the outputted card from the output device 28 of the card issuing machine 16 by entering the authorization code into the input device 24 of the card issuing machine 16 adapted for manual entry of the authorization code.

The check cashing system 10 can be used to transfer or send money to other people. For example, assume a customer wanted to send money to a third party. The customer can run a check through the check reader 14, which sends the signals to the check processing system 18 to obtain the authorization code. Once the customer receives the authorization code, the customer can communicate the authorization code to the third party via regular mail, e-mail or telephone, for example. The third party can then input the authorization code into one of the card issuing machines 16 to obtain the outputted card.

The following examples of the operation of the check cashing system 10 are set forth hereinafter. It is to be understood that the examples are for illustrative purposes only and are not to be construed as limiting the scope of the invention as described.

EXAMPLE 1

The check reader 14 can be positioned at a point-of-sale terminal provided at a retail location, such as a convenience store or a grocery store. The check processing system 18 can be a web-site on the Internet or a database server having computer hardware located at or remote from the retail location. A customer brings a check written for $100 to the point-of-sale terminal provided at the retail location. A check cashing signal, including the check code, is transmitted to the check processing system 18 via a local area network. The check processing system 18 validates and records the cashing of the $100 check and assigns a unique authorization code to identify the cashing of the $100 check. The authorization code is transmitted from the website to the check reader 14 via the signal path 20. The authorization code is transmitted to the point-of-sale terminal and printed on a receipt for the customer. The customer travels to any card issuing machine 16 having access to the Internet and enters the authorization code into the card issuing machine 16. The card issuing machine 16 transmits the authorization code to the check processing system 18 via the signal path 30 and obtains authorization to provide the customer with an outputted card having up to $100. An amount charged for a service fee or any other applicable fees, such as that paid to each of the owners of the check reader 14, the card issuing machine 16, or the check processing system 18 will be deducted from the $100. The customer takes the card having the monetary amount from the card issuing machine 16 and then uses the card to purchase goods or services. The card issuing machine 16 transmits a signal to the check processing system 18 via the signal path 30 to indicate that a card with a $100 minus the applicable fee was given to the customer.

EXAMPLE 2

A customer brings a check written for $100 to the check reader 14 provided at a retail location. The check is read by the check reader 14 and a check cashing signal, including the check code, is transmitted to the check processing system 18 via a local area network. The check processing system 18 validates and records the cashing of the $100 check and assigns a unique authorization code to identify the cashing of the $100 check. The authorization code is transmitted from the check processing system 18 to the check reader 14 via the signal path 25. The authorization code is displayed on the check reader 14 where the clerk reads the authorization code and manually enters the authorization code into the card issuing machine 16 for the customer which is in the same location as that of the clerk. The card issuing machine 16 transmits the authorization code to the check processing system 18 via the signal path 30 and obtains authorization to provide the customer with the outputted card having up to $100. The amount charged for the service fee or any other applicable fees, such as that paid to each of the owners of the check reader 14, the card issuing machine 16, or the check processing system 18 will be deducted from the $100. The customer takes the card having the monetary amount from the card issuing machine 16 and then uses the card to purchase goods or services. The card issuing machine 16 transmits a signal to the check processing system 18 via the signal path 30 to indicate that a card with a $100 minus the applicable fee was given to the customer.

EXAMPLE 3

A son who lives in New York wishes to send money to his mother living in Oklahoma. The son goes to a kiosk and gives a clerk his paycheck. The clerk then runs the check through a check reader 14 or manually enters the check's routing code into a keypad provided by the check reader 14. The check code is transmitted via a signal path to the check processing system 18 or another third-party database. An authorization code is provided representing at least one of a guarantee or authorization. The check reader 14, provided with a printer terminal, receives the authorization code and prints a receipt having the authorization code. The clerk hands the receipt to the son. The son then calls or e-mails his mother and provides the authorization code to her. The mother goes to a card issuing machine 16 in Oklahoma and manually enters the authorization code into the input device 24 (keypad) of the card issuing machine 16, which in this instance is typically connected to part of a network associated with the check reader 14 located in New York. The card issuing machine 16 communicates with the check processing system 18 or other database (or locally validates the authorization code) and validates the authorization code. Then, the card issuing machine 16 loads an outputted card having a value with the output device 29.

Changes may be made in the construction and the operation of the various components, elements and assemblies described herein or in the steps or the sequence of steps of the methods described herein without departing from the spirit and scope of the invention as defined in the following claims.

What is claimed is:

1. A customer interface system for use with a check processing system, comprising:
   a check reader receiving a check code indicative of a check having a predetermined value and transmitting the check code to the check processing system for at least one of authorizing and guaranteeing payment of at least a portion of the value of the check; and
   a card issuing machine operatively associated with the check reader, the card issuing machine receiving an authorization code representing at least one of the authorization and the guarantee from the check processing system and providing an outputted card loaded with at least a portion of the predetermined value of the check.

2. The customer interface system of claim 1, wherein the check code is transmitted from the check reader to the check processing system, the check processing system identifying the check code and generating the authorization code which is transmitted to the check reader.

3. The customer interface system of claim 1 wherein the check reader is positioned at a point of sale terminal.

4. The customer interface system of claim 1 wherein the card issuing machine has an input device receiving the authorization code and an output device at least one of generating and outputting the outputted card.

5. The customer interface system of claim 1 wherein the check reader receives the authorization code and outputs the authorization code in a format perceivable by an individual.

6. The customer interface system of claim 5 wherein the card issuing machine has an input device adapted for manual entry of the authorization code.

7. The customer interface system of claim 5 wherein the card issuing machine has an input device in communication with at least one of the check reader and the check processing system.

8. The customer interface system of claim 1 wherein the card issuing machine and the check reader are located at a same physical location.

9. The customer interface system of claim 1 wherein the card issuing machine and the check reader are remotely located.

10. A check cashing system, comprising:
    a check reader having an input device and an output device, the input device obtaining a check code from a check having a predetermined value, the output device receiving the check code and transmitting the check code;
    a check processing system for guaranteeing payment of at least a portion of the predetermined value of the check, the check processing system receiving the check code, determining the validity of the check, and transmitting an authorization code; and a card issuing machine receiving the authorization code and providing an outputted card loaded with at least a portion of the predetermined value of the check.

11. The check cashing system of claim 10 wherein the check code is transmitted from the check reader to the check processing system, the check processing system identifying the check code and generating the authorization code which is transmitted to the check reader.

12. The check cashing system of claim 11 wherein the check reader is positioned at a point of sale terminal.

13. The check cashing system of claim 10 wherein the authorization code generated by the check processing system is transmitted directly to the card issuing machine.

14. A customer interface system for use with a check processing system, comprising:

a plurality of check readers, each of the check readers receiving ad transmitting at least one respective check code for receiving respective authorization codes; and a plurality of card issuing machines, each of the card issuing machines receiving respective authorization codes so as to provide an outputted card loaded with at least a portion of a predetermined value of the check.

15. The customer interface system of claim 14, wherein at least one of the check readers communicate the authorization code to at least one of the card issuing machines.

16. The customer interface system of claim 14 wherein the check processing system transmitting the authorization code to each of the plurality of card issuing machines.

17. The customer interface system of claim 14 wherein each of the card issuing machines has an output device generating the outputted card having a value thereon.

18. A method of using a check cashing system to distribute a card with a predetermined value, the method comprising the steps of;

receiving a check via a point of sale terminal from a customer wherein a check reader obtains a check code from the check;

transmitting a check cashing signal including the check code;

receiving the check cashing signal via a check processing system;

validating the check via the check processing system;

generating and assigning via the check processing system an authorization code to identify the cashing of the check;

transmitting the authorization code to the check reader;

entering the authorization code into a card issuing machine;

loading an outputted card loaded with at least a portion of the predetermined value of the check; and providing the customer with the outputted card.

19. The method of claim 18 further comprising the step of printing via a printer the authorization code on a receipt for a customer.

20. A method for cashing a check, the method comprising the steps of:

receiving a check having a value at a first location;

receiving an authorization code at the first location for at least one of authorizing or guaranteeing of at least a portion of the value of the check;

entering the authorization code into a card issuing machine at a second location remote from that of the first location;

loading an outputted card with with at least a portion of the predetermined value of the check; and providing an outputted card at the second location remote from that of the first location.

21. The method of claim 20 further comprising the step of printing via a printer the authorization code on a receipt.

* * * * *